United States Patent [19]
Raschka et al.

[11] Patent Number: 5,687,852
[45] Date of Patent: Nov. 18, 1997

[54] TUBULAR FREE-FALL SEPARATOR FOR SEPARATING PLASTIC MIXTURES

[75] Inventors: Norbert Raschka, Philippsthal; Ingo Stahl, Vellmar, both of Germany

[73] Assignee: Kali und Salz GmbH, Kassel, Germany

[21] Appl. No.: 549,102

[22] Filed: Oct. 27, 1995

[30] Foreign Application Priority Data

Oct. 29, 1994 [DE] Germany .................. 44 38 704.0

[51] Int. Cl.$^6$ ...................................................... B03C 7/00
[52] U.S. Cl. ........................................................ 209/127.4
[58] Field of Search ............................ 209/127.4, 127.1, 209/128, 129, 130

[56] References Cited

U.S. PATENT DOCUMENTS 5,251,762  10/1993  Taylor et al. ............... 209/127.4

FOREIGN PATENT DOCUMENTS

| 1154052 | 5/1960 | Germany . |
| 4127572 | 8/1991 | Germany . |
| 4127574 | 8/1991 | Germany . |
| 4127575 | 8/1991 | Germany . |

OTHER PUBLICATIONS

Chem.-Ing.-Techn. 53 (1981), No.12, p. 923.

Primary Examiner—David H. Bollinger
Attorney, Agent, or Firm—Collard & Roe, P.C.

[57] ABSTRACT

A tubular free-fall separator for the electrostatic separation of particles of a plastics mixture, includes two parallel opposite rows of vertical tubes which are either arranged rotatably around their own axis or are fixedly installed and are connected with a direct current voltage source for maintaining an electrostatic field between the rows. The tube rows are arranged in such a manner that two adjacent axis points of the tubes of one row always form a parallelogram, which has no right angles, with the opposite adjacent two axis points of the tubes of the other row.

3 Claims, 1 Drawing Sheet

FIG. 1
FIG. 2
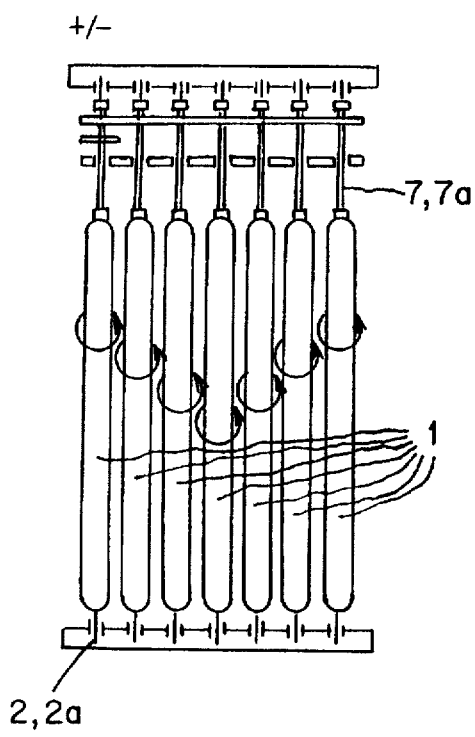
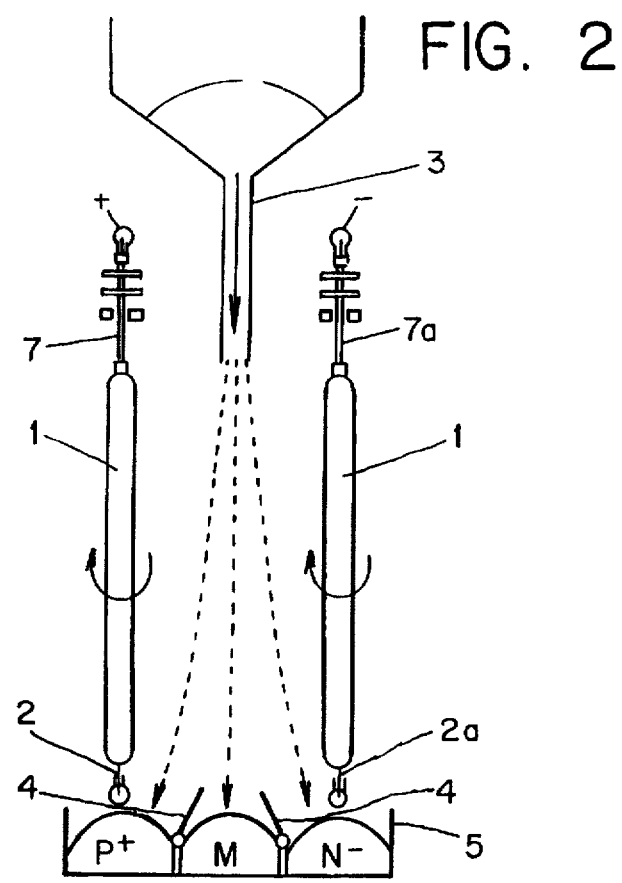
FIG. 3
(PRIOR ART)
FIG. 4
FIG. 5
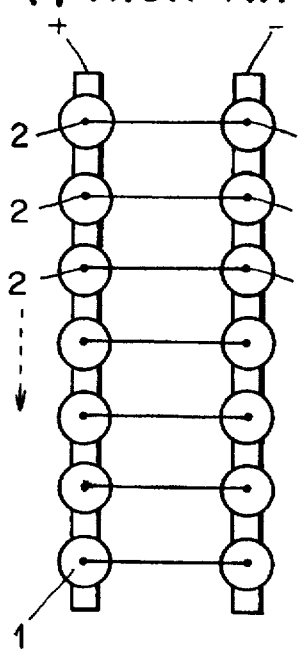
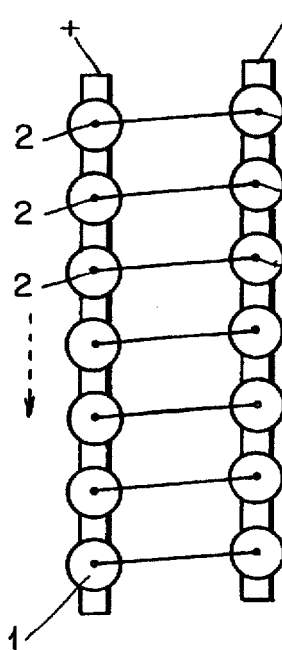
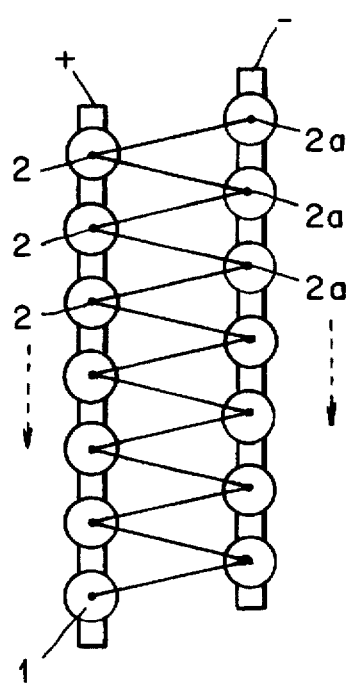

TUBULAR FREE-FALL SEPARATOR FOR SEPARATING PLASTIC MIXTURES

BACKGROUND OF THE INVENTION

1. Field of the Invention

The present invention relates to an enhanced device for a tubular free-fall separator for separating plastic mixtures in an electrostatic field.

2. The Prior Art

In the last few years, attention has been increasingly paid to separation in the electrostatic field for technical applications, not only in connection with minerals but more recently also for the separation of mixtures of plastics. This type of particular separation is in connection with plastics that have similar densities, and where the usual sink-float separation process will fail.

For example, DE 4,127,575 describes the separation of polyethylene terephthalate (PET) from polyvinyl chloride (PVC), and DE 4,127,574 describes the separation of polyethylene (PE) from polypropylene (PP).

For separating these plastics, apparatuses have been used first as they were commonly applied also for the separation of minerals. Normally, the latter have a significantly higher density and move in the electrostatic field in relatively defined parabolic orbits.

In connection with the free-fall separators commonly used in the prior art, the tubes are exactly disposed opposite each other (FIG. 1), which means that the axial points of rotation, when viewed from the top, are disposed in a rectangular shape. This type of tubular separator is described in greater detail in DE 1,154,052, and also in Chem.-Ing.-Techn. 53 (1981), No. 12, p. 923.

Plastics, which in many cases have a leaf-like structure following crushing, have the tendency to float in the electrostatic field, whereby they bump against the electrodes and rebound from the latter, and they sometimes move relatively uncontrolled in undesirable directions.

The result of this behavior is that some of the particles, even though small in numbers, appear in the wrong fractions, where they prevent the desired or required purity. Such "strayers" have to be removed and excluded because purities are now required that reach up to the ppm-scale.

SUMMARY OF THE INVENTION

It is an object of the present invention to increase the selectivity of a tubular free-fall separator for the separation of mixtures of plastics.

Now, it has been found that superior separation results can be achieved according to the invention, if the configuration of the tubes is different from the configuration according to the state of the art.

If the axial points of rotation of the tubes of the one side are slightly displaced, so that these points no longer form the corner points of a rectangle but instead form the shape of a parallelogram with oblique angles, the particles, when accelerated in the direction of the opposite tubes, have a chance of flying past the latter. The probability of impact and deflection in the opposite direction is substantially reduced.

The best results are obtained when the points of rotation are exactly shifted to the center vertical, i.e. when two adjacent axial points of the tube of one row form an isosceles triangle or an equally sided triangle with an axial point of the opposite row.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 1 shows a side view of a row of tubes according to the invention;

FIG. 2 shows a front view of two opposite tubes with the voltage marked positive or negative according to the invention;

FIG. 3 shows a prior art arrangement of tubes in a free-fall separator;

FIG. 4 shows a parallelogram arrangement of tubes according to the invention; and FIG. 5 shows a triangular arrangement of tubes according to the invention.

Other objects and features of the present invention will become apparent from the following Examples, which disclose the preferred embodiments of the present invention. It should be understood, however, that the Examples are designed for the purpose of illustration only and not as a definition of the limits of the invention.

DETAILED DESCRIPTION OF THE PREFERRED EMBODIMENTS

Example

Turning now in detail to the drawings, FIG. 1 shows a row of tubes 1 having a vertical axis 7 or 7a having axis points 2 and 2a for these tubes. FIG. 2 shows vertical axes 7 and 7a having axis points 2 and 2a of the two sets of opposite parallel rows of tubes 1. Between the upper ends of the tube rows 1 is placed a feeding device 3 for the plastic mixture to be separated. The falling particles are separated by separating walls 4 within the collection container 5. The product P+ is collected on the + electrode, while the product N− is collected on the − electrode. Any uncharged middle product M is collected between the positive product P and the negative product N. The arrangement of tubes according to the invention (FIGS. 4 and 5) of the tubes 1 differs from the known tubular free-fall separator (FIG. 3) due to the displacement of the axis points 2, 2a, of the respective opposite tubes 1 (FIGS. 4, 5). The positioning of the other elements of the free-fall separator is shown in the drawing in FIG. 2. This includes the opposite parallel rows of vertical tubes 1, the feeding device 3, the separating walls 4, the collecting container 5 for the separation products P+, middle products M, and negative products N−.

The tubes either can all be rotated around their longitudinal axis as shown by the arrows in FIG. 1, or are all fixedly installed. The rotational arrangement of the vertically arranged tubes 1 is undertaken when the tubes are provided with brushes for cleaning (not shown in the drawing). The separator of the invention is a specific separating apparatus for the electrostatic separation of particles of a plastic mixture of different types of plastics.

A first embodiment of the invention has the opposite rows of tubes 1 positioned in such a way that two adjacent axis points 2 and 2 of the tubes in one row always form a parallelogram, which has no right angles, with the opposite adjacent two axis points 2a and 2a of the tubes of the other row, as shown in FIG. 4.

In a second embodiment, which is preferred, the parallelogram has angles positioned in such a way that two adjacent axis points 2 and 2 of the tubes 1 of the one row form a triangle namely an isosceles triangle with the opposite axis points 2a of the respective tubes of the other row, as shown in FIG. 5.

This arrangement of the opposite row of tubes is shown in FIGS. 4 and 5 by the indication of the parallelograms or the isosceles triangles.

The arrangement of the tubes versus the state of the prior art (FIG. 3) is shown in FIGS. 4 and 5 in a top view. In the present embodiment, vertical tubes of an otherwise known tubular free-fall separator are arranged in such a way that the spacing between the tubes amounts to 1.5 times the diameter of the individual tube. Such a row forms in each case one of the electrodes. Now, according to the invention, both electrodes are arranged in such a way that the tubes are staggered in each case i.e., two adjacent axial points of the tubes of one electrode in each case form a parallelogram or form an isosceles triangle with an axial point of the tubes of the other, opposite electrode.

As compared to the prior art arrangement used heretofore, a homogeneous electrical field develops according to the invention that is changed only insignificantly. The proportion of particles reflected by the electrode is substantially reduced. Highly deflected particles are capable of flying through between the tubes and exiting from the zone of separation, so that the other particles are no longer obstructed, which significantly enhances the selectivity of the separation.

The results of separation tests are shown in the following TABLE 1 in a comparison between the separator according to the embodiment of the invention and the known tubular free-fall separator, for the separation of polycarbonate (PC) —polymetamethacrylate (PMMA) is presented.

Both types of separator were operated with the same feed material under the same conditioning conditions and with identical settings. The feed material was passed through the separator only once and collected below in separation troughs.

Feed Through-put: 89 kg/h
Conditioning: with 70 g/t fatty acid
Contacting at 45° C. in the fluidized-bed heater
Field intensity: 3.5 kV/cm
Relative moisture: 28.4%
at RT 21° C.

TABLE 1

|  | + P % | Intermediate % | − N % |
|---|---|---|---|
| 1. Tubular Separator (State of the Art) | | | |
| Quantitative Yield | 15.9 | 60.0 | 24.1 |
| PMMA Yield | 4.5 | 49.2 | 46.3 |
| Content of Valuable Material | 13.8 | 40.5 | 95.1 |
| PC Yield | 27.2 | 70.5 | 2.3 |
| Content of Valuable material | 86.2 | 59.5 | 4.9 |
| 2. Tubular Separator (According to the Invention) | | | |
| Quantitative Yield | 27.5 | 39.1 | 33.4 |
| PMMA Yield | 4.1 | 26.4 | 69.4 |

TABLE 1-continued

|  | + P % | Intermediate % | − N % |
|---|---|---|---|
| Content of Valuable Material | 7.0 | 31.4 | 96.7 |
| PC Yield | 47.8 | 50.1 | 2.1 |
| Content of Valuable material | 93.0 | 68.6 | 3.3 |

The advantage of the separator according to the invention is clearly demonstrated by the results. The intermediate component is distinctly lower than with the conventional separator, and the separation effect is significantly superior. A substantially lower separation capacity is required.

The purities of the fractions P and N differ just as distinctly. While both fractions are separated with the separator according to the invention with a purity exceeding 90% by far, this is possible with the comparative separator for one fraction only.

While several embodiments of the present invention have been shown and described, it is to be understood that many changes and modifications may be made thereunto without departing from the spirit and scope of the invention as defined in the appended claims.

What is claimed is:

1. Tubular free-fall separator for separating plastic mixtures comprising two opposite parallel rows of vertical tubes, and each tube having a vertical axis, and each vertical axis having an axis point;

a dc voltage source for maintaining an electrostatic field electrically connected to said tubes;

wherein there are four adjacent axis points of the tubes, and two of said axis points of one row being opposite to two other axis points of another row and are disposed in each case angularly displaced to form corners which form a parallelogram having no right angles.

2. Tubular free-fall separator for separating plastic mixtures comprising two opposite parallel rows of vertical tubes, and each tube having a vertical axis, and each vertical axis having an axis point;

a dc voltage source for maintaining an electrostatic field electrically connected to said tubes;

wherein two axis points of the tubes of one row of tubes form an equally-sided triangle with one axis point of an opposite row of tubes.

3. Tubular free-fall separator for separating plastic mixtures comprising two opposite parallel rows of vertical tubes, and each tube having a vertical axis, and each vertical axis having an axis point;

a dc voltage source for maintaining an electrostatic field electrically connected to said tubes;

wherein two axis points of the tubes of one row of tubes form an isosceles triangle with one axis point of an opposite row of tubes.

* * * * *